Nov. 5, 1957  R. D. SCHIFF  2,812,183
PUZZLE
Filed Sept. 20, 1954
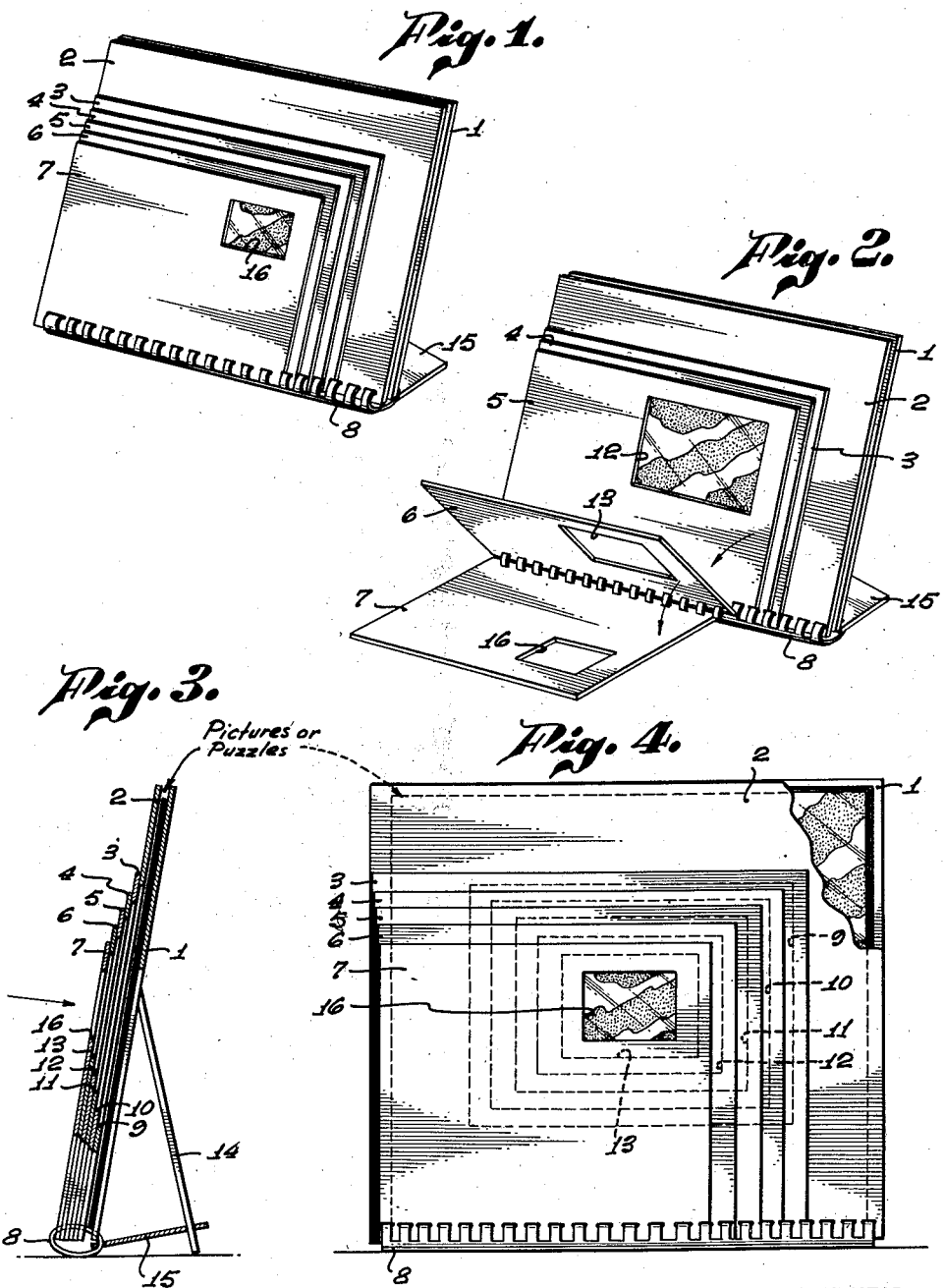
INVENTOR.
ROBERT D. SCHIFF,
BY
ATTORNEY.

United States Patent Office 2,812,183
Patented Nov. 5, 1957

2,812,183

PUZZLE

Robert D. Schiff, Encino, Calif.

Application September 20, 1954, Serial No. 456,924

1 Claim. (Cl. 273—155)

The present invention relates broadly to games and more specifically to that type of game which comes under the classification of intellectual or games of skill.

Primarily, I contemplate a game which while amusing, at the same time, may be difficult to solve or made easy for the players, largely depending upon their age and educational background. I contemplate a game which may be used at social gatherings and made amusing and fun provoking, as well as educational, by the operator of the game.

An object of the invention is the provision of a game of attractive character, inexpensive to purchase, wherein the game may be changed both as to character of material used and its method of use, which is easily transported or filed away, and generally superior to educational games now known to the inventor.

In the drawing:

Figure 1 is a perspective view of a device which is incorporated in the practice of the invention for playing the game, Figure 2 is a perspective view similar to Figure 1, certain elements of the game device being in moved position, Figure 3 is an end elevation of the device for playing the game shown in Figures 1 and 2, and, Figure 4 is an elevation on an enlarged scale, partly in fragment, showing various elements of the game device.

Referring now with particularity to the drawing, I provide a porfolio having a relatively stiff back leaf 1, and a series of leaves of any number, such as shown at 2, 3, 4, 5, 6 and 7, in Figure 3, by way of illustration. In the present instance, each leaf is provided with aligned slots adjacent its bottom edge for reception of rings of the flat ring binder type, designated generally as 8. No particular type of ring binder is contemplated, the one shown being illustrative only. The leaf 2 has approximately the same dimension as the back leaf 1, while the remaining leaves may vary as to height and width, as shown in the figures.

Referring to Figure 4 specifically, the leaf 2 is provided with an enlarged window or cut-out area 9, of rectangular form, in the present instance, and said cut-out is spaced centrally of said leaf, as indicated by the dotted lines. Each successive leaf from 3 to 7 is provided with a cut-out area of diminishing size, as shown by the dotted lines at 10, 11, 12 and 13. The centers of each cut-out area may lie on the same line or axis, and adjacent bounding edges of each cut-out are in parallel relationship. It is for the reason that cut-out areas vary in size, that the said leaves may vary in size, as shown in Figure 1, for instance. An easel may be utilized so that the portfolio may stand upright, as shown in Figure 3, the said easel comprising the members 14 and 15.

The operation, uses and advantages of the invention are as follows:

With each portfolio, it is inventor's intention to provide a series of pictures which may be inserted between the back leaf 1 and leaf 2. These may take the form of famous paintings, comic characters, drawings, or any other object such as puzzle which is to be identified by the player. To begin with, all the leaves are overlapped in the position of Figure 1, and the player views the object between the leaves 1 and 2 through the restricted area window 16 of leaf 7. This gives the player a small field of view of the object to be identified. The leaves are numbered so that a record or tally may be kept of the player's ability in deciphering the object between the leaves 1 and 2.

If the object is not identified, the leaf 7 is dropped to the position shown in Figure 2, and the object viewed through the next larger window, and so on, until the object is fully exposed to the player. A score is made for this particular player's ability to decipher the object. The particular object is then changed so that the next player may identify the following object through the smallest window 16, and so on.

In the playing of the game, it is not essential that the windows all be positioned centrally of the sheets but may start at an edge of a leaf and gradually increase in area in succeeding leaves. The windows may be of any geometric form desired—such as crescent, round, star-shaped, etc. In this manner, spot areas of the subject to be identified are revealed.

Obviously, the leaves may be loosely assembled in the portfolio without use of the ring binder.

I claim:

A game including a portfolio having a backing and a first windowed leaf, between which is placed the subject-matter to be solved by exposing areas thereof; a series of leaves forward of the first leaf wtih each leaf provided with a rectangular-shaped window, the areas of said windows being reduced progressively from the first leaf to the outermost leaf, the arrangement being such that the subject-matter to be solved is viewed through the windowed outermost leaf, and the windowed sheets that follow progressively exposing the subject-matter through windows of increased area until the entire area of the subject-matter is exposed through the first sheet.

References Cited in the file of this patent

UNITED STATES PATENTS

| 799,609 | Ludwig | Sept. 12, 1905 |
| 2,091,260 | Farkas et al. | Aug. 31, 1937 |
| 2,149,779 | Kroner | Mar. 7, 1939 |

FOREIGN PATENTS

| 635,724 | Germany | Sept. 29, 1936 |